Figure 20:
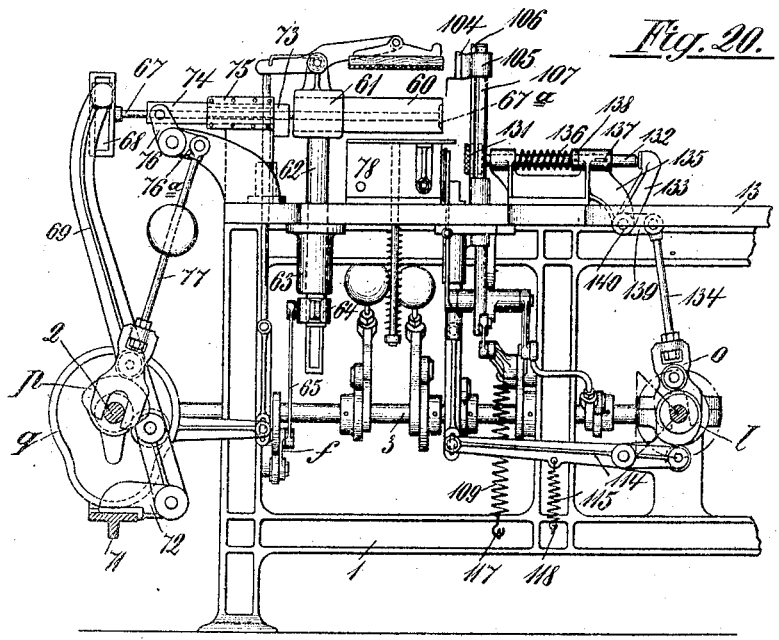

No. 813,207. PATENTED FEB. 20, 1906.
O. HESSER.
MACHINE FOR MAKING PAPER BAGS.
APPLICATION FILED JUNE 24, 1904.
12 SHEETS—SHEET 1.
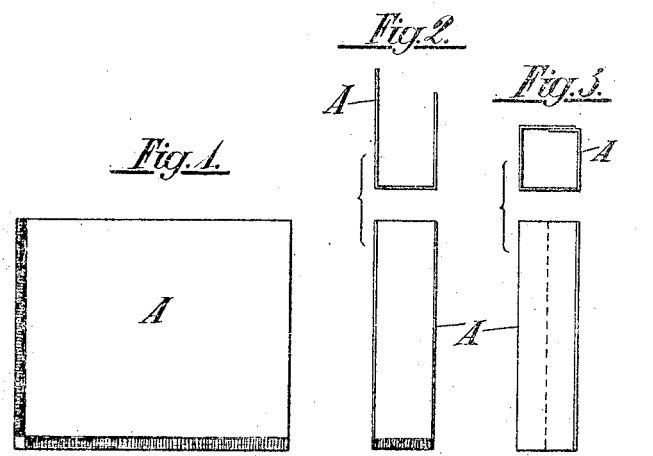
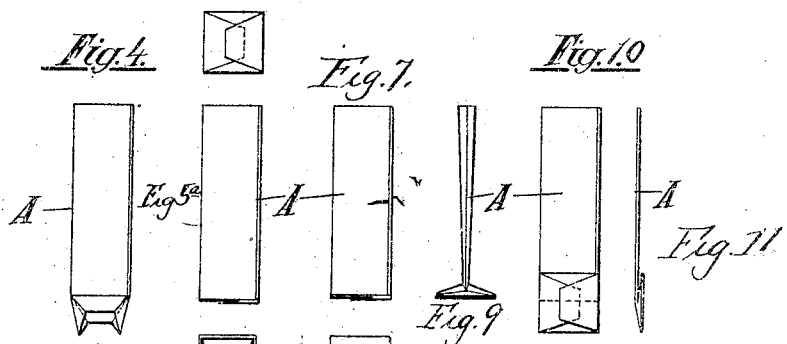

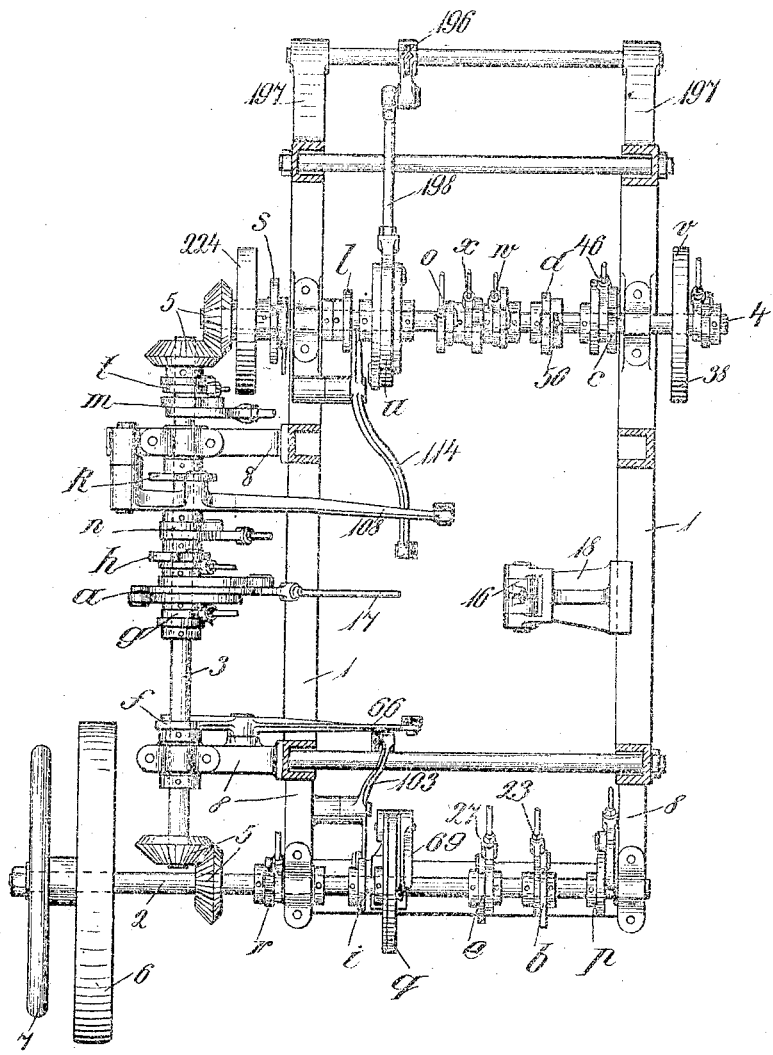

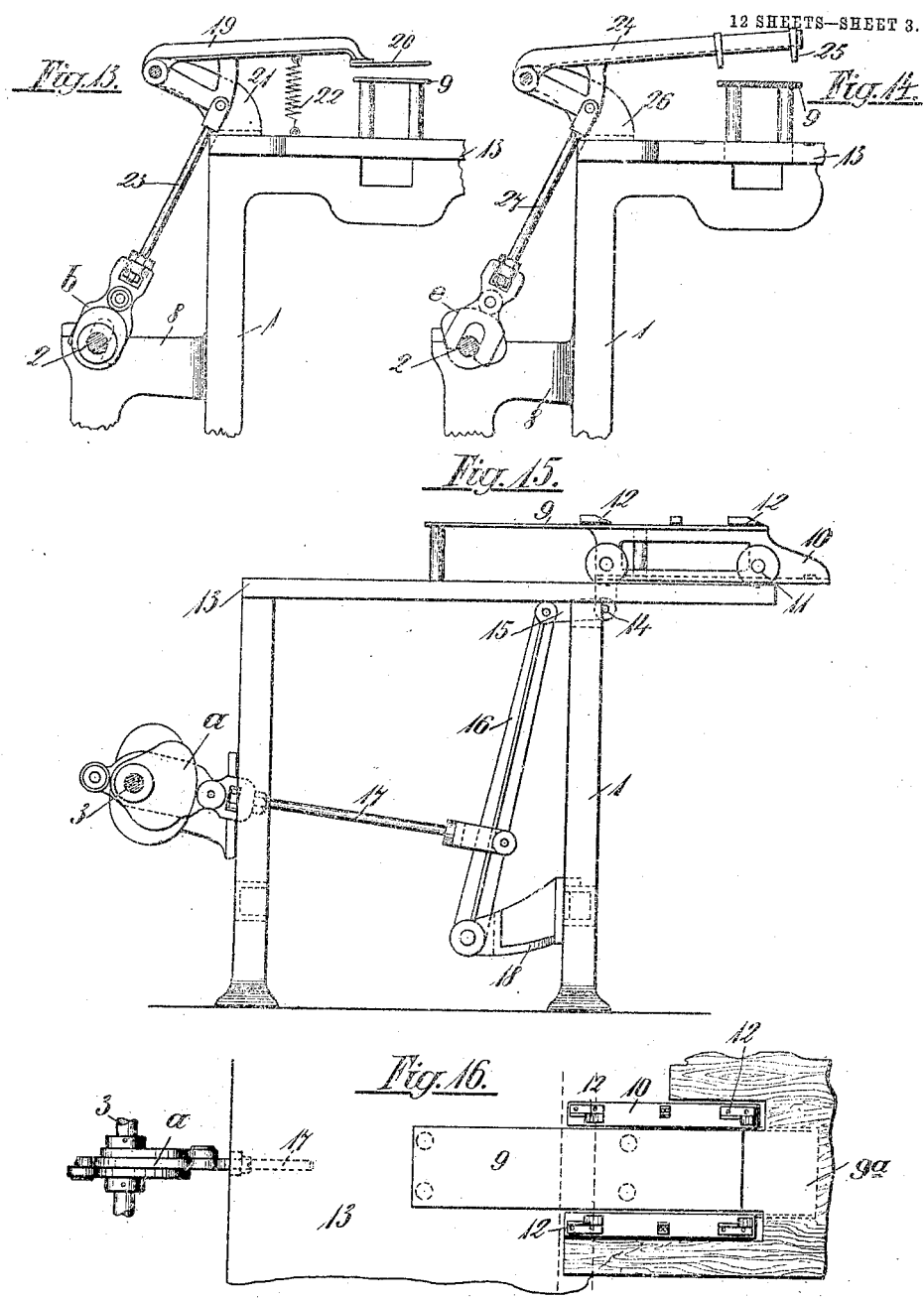

No. 813,207. PATENTED FEB. 20, 1906.
O. HESSER.
MACHINE FOR MAKING PAPER BAGS.
APPLICATION FILED JUNE 24, 1904.
12 SHEETS—SHEET 4.
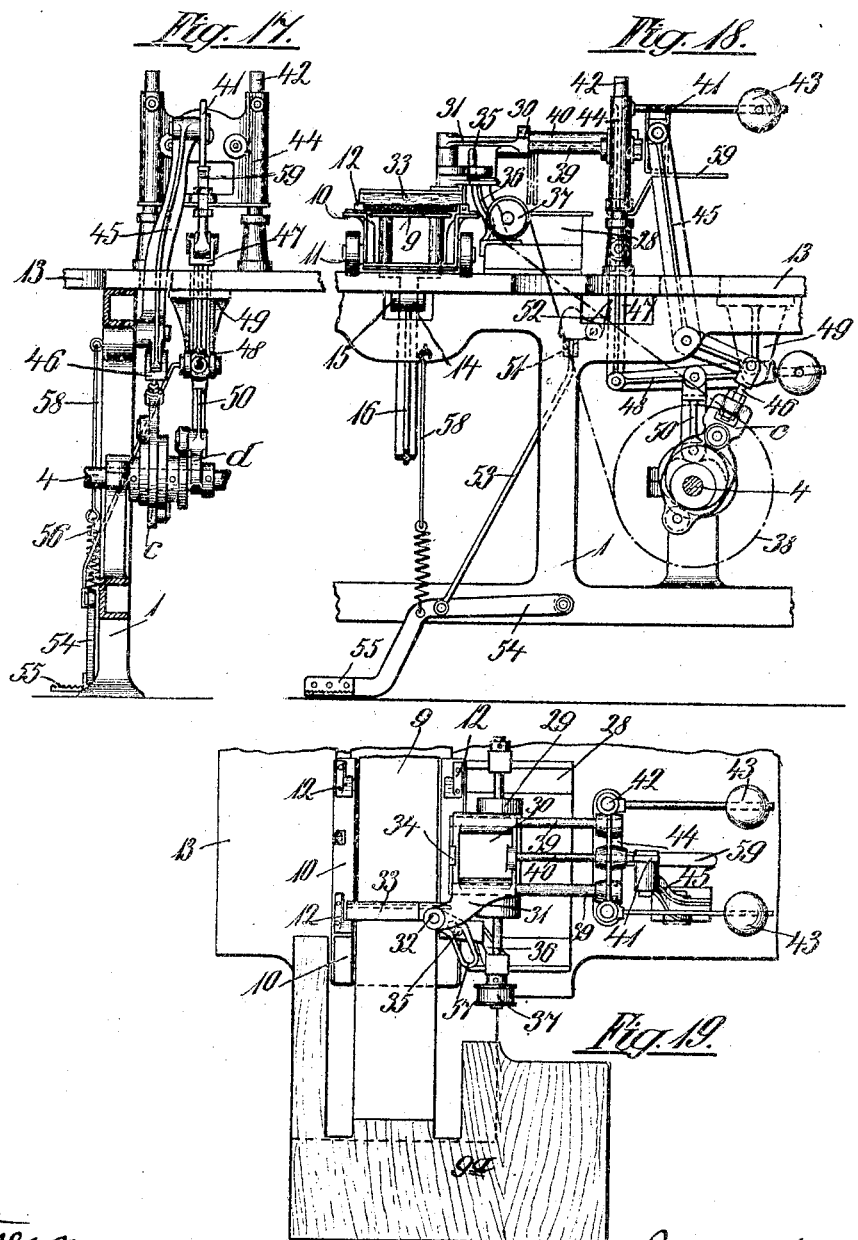

No. 813,207. PATENTED FEB. 20, 1906.
O. HESSER.
MACHINE FOR MAKING PAPER BAGS.
APPLICATION FILED JUNE 24, 1904.

12 SHEETS—SHEET 5.

Witnesses
Albert Popkins
Frank G. Brereton

Inventor
Otto Hesser
By Sturtevant & Greely
his Attorneys

No. 813,207. PATENTED FEB. 20, 1906.
O. HESSER.
MACHINE FOR MAKING PAPER BAGS.
APPLICATION FILED JUNE 24, 1904.
12 SHEETS—SHEET 6.
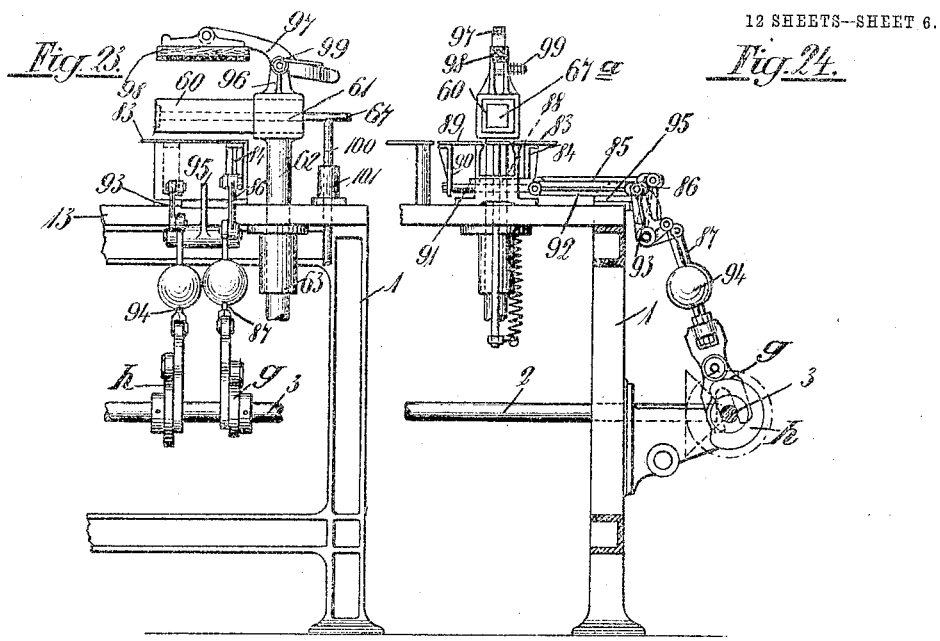
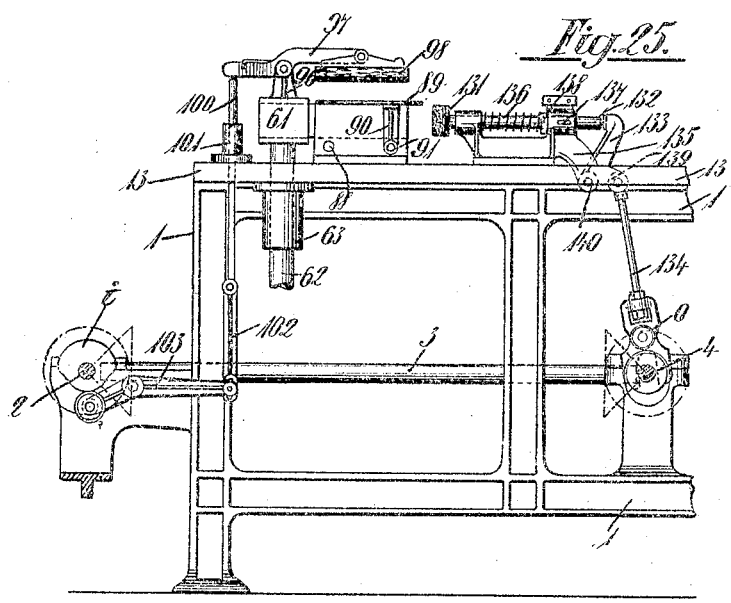
Witnesses
Albert Popkins
Frank G. Burton
Inventor
Otto Hesser
By Sturtevant & Greely
his Attorneys

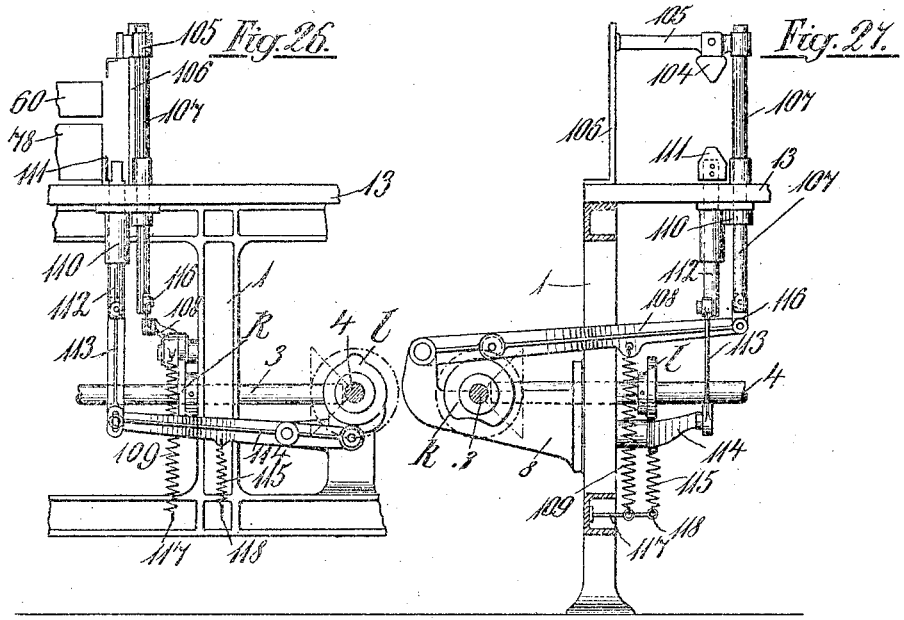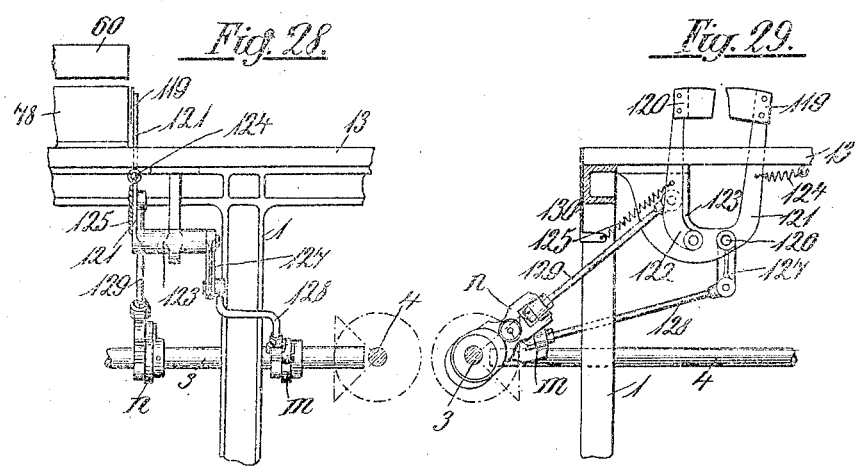

No. 813,207. PATENTED FEB. 20, 1906.
O. HESSER.
MACHINE FOR MAKING PAPER BAGS.
APPLICATION FILED JUNE 24, 1904.
12 SHEETS—SHEET 8.
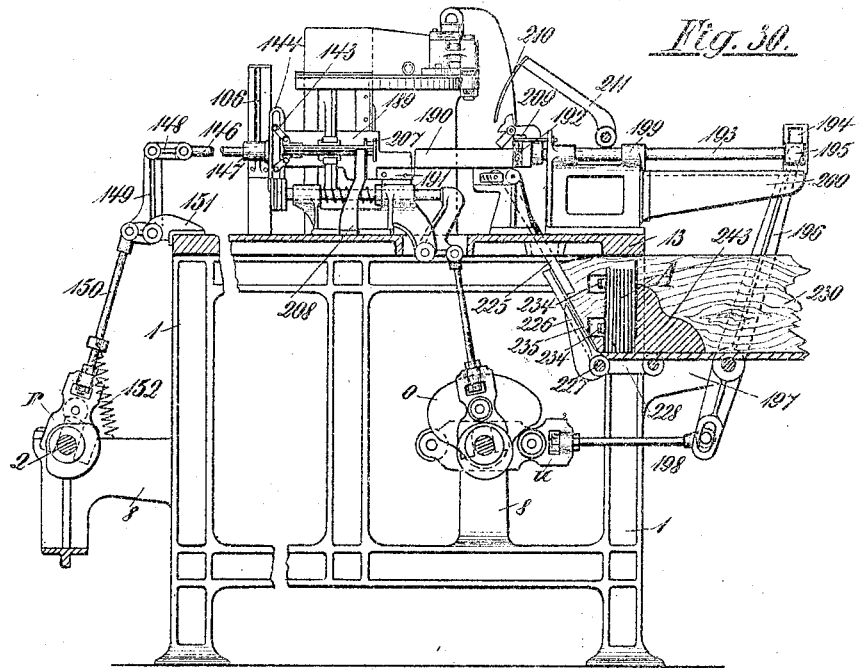
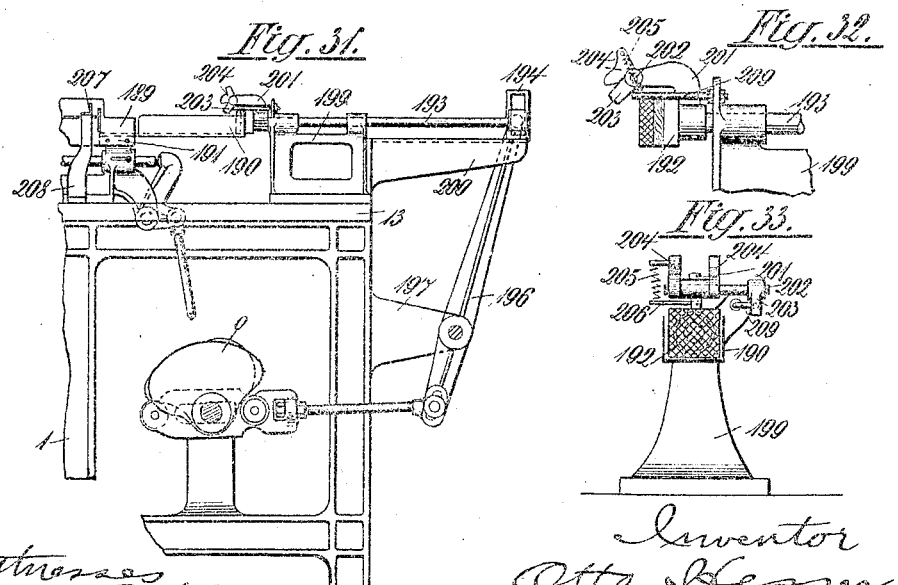

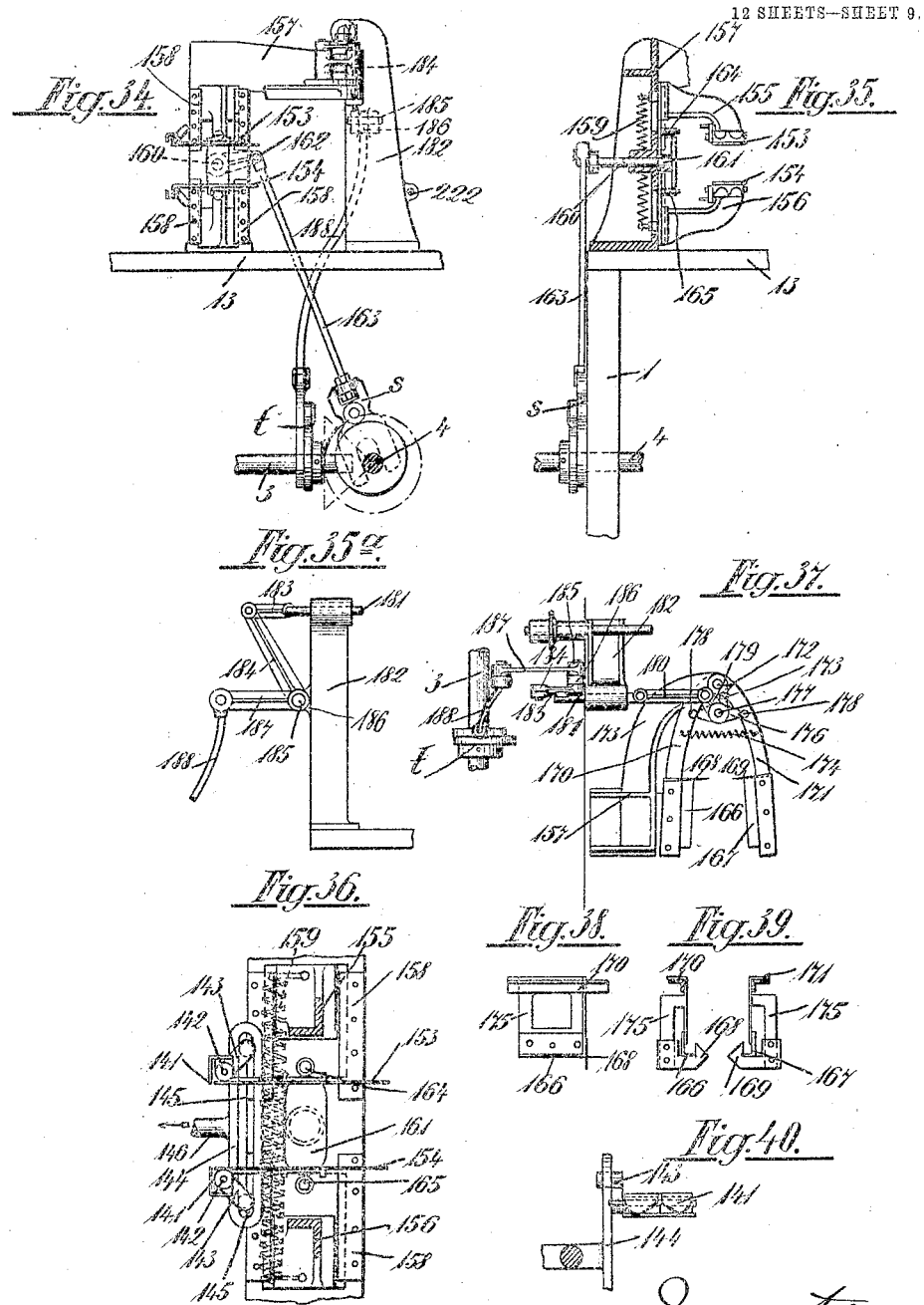

No. 813,207. PATENTED FEB. 20, 1906.
O. HESSER.
MACHINE FOR MAKING PAPER BAGS.
APPLICATION FILED JUNE 24, 1904.
12 SHEETS—SHEET 10.
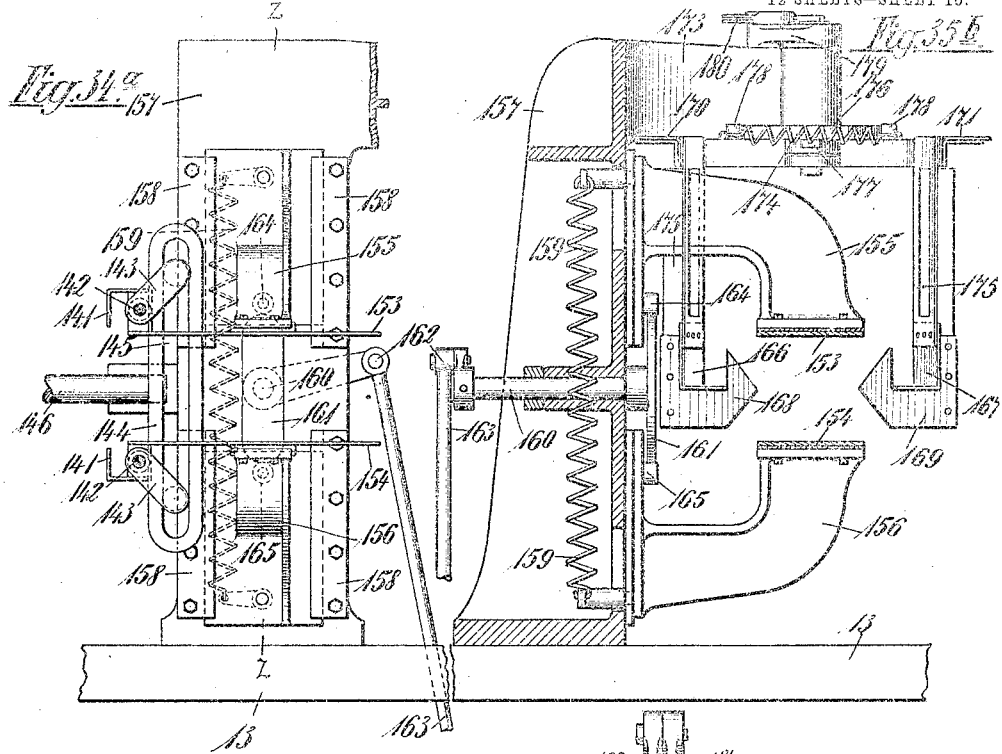
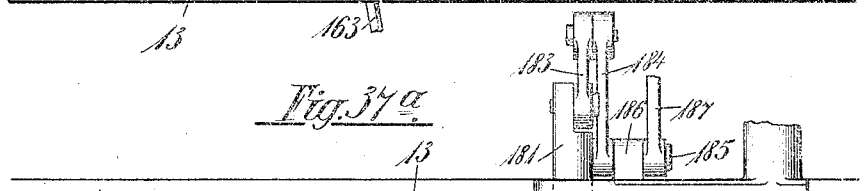
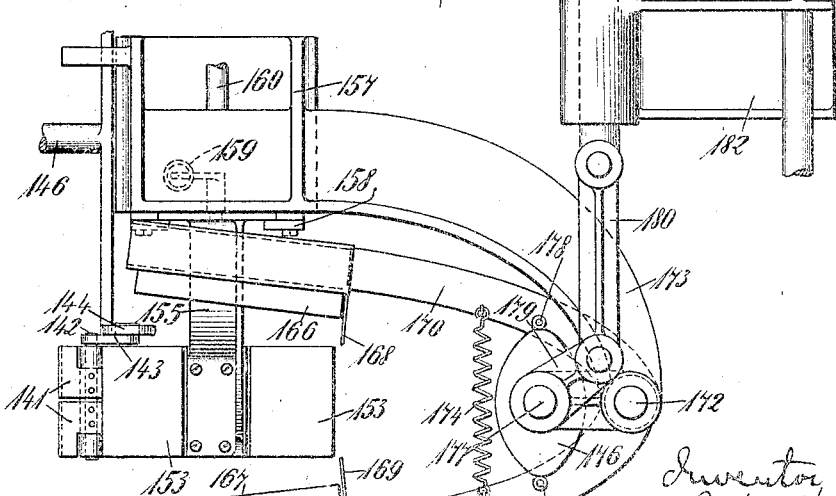

No. 813,207. PATENTED FEB. 20, 1906.
O. HESSER.
MACHINE FOR MAKING PAPER BAGS.
APPLICATION FILED JUNE 24, 1904.
12 SHEETS—SHEET 11.
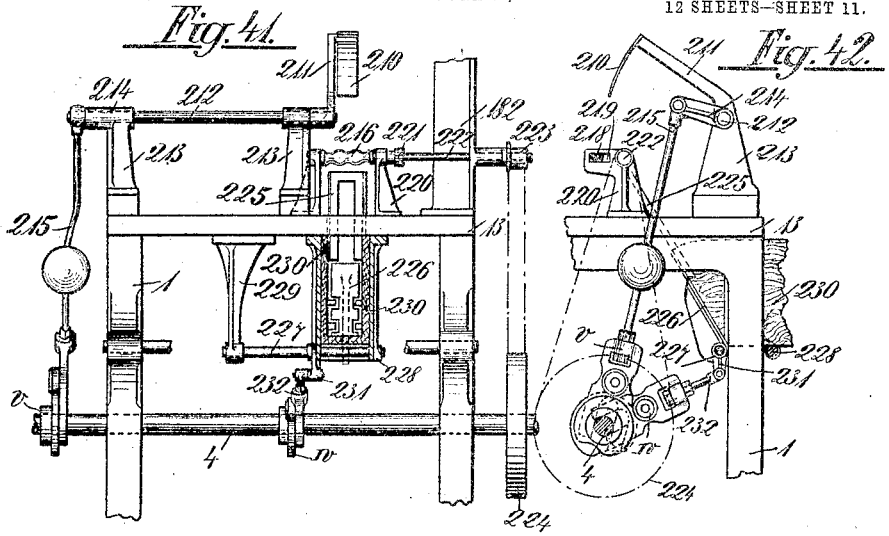
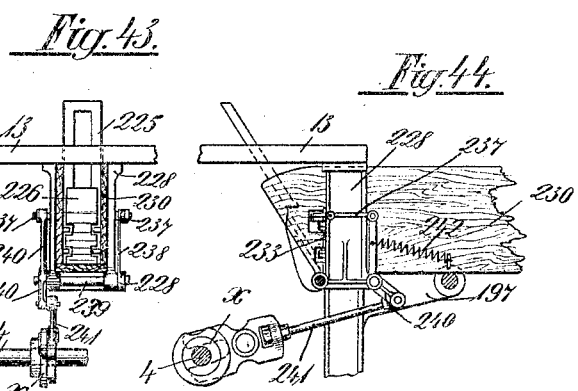
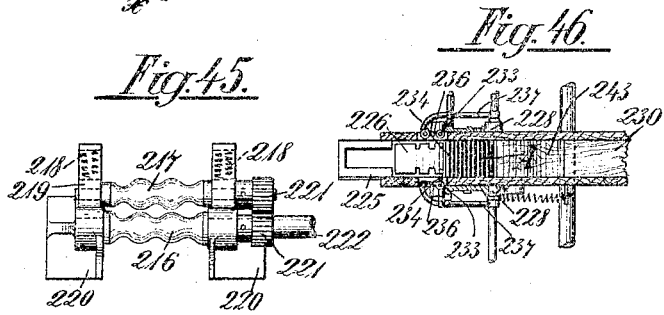
Witnesses
Albert Popkins
Frank G. Bureton
Inventor
Otto Hesser
By Sturtevant & Freeley
his Attorneys

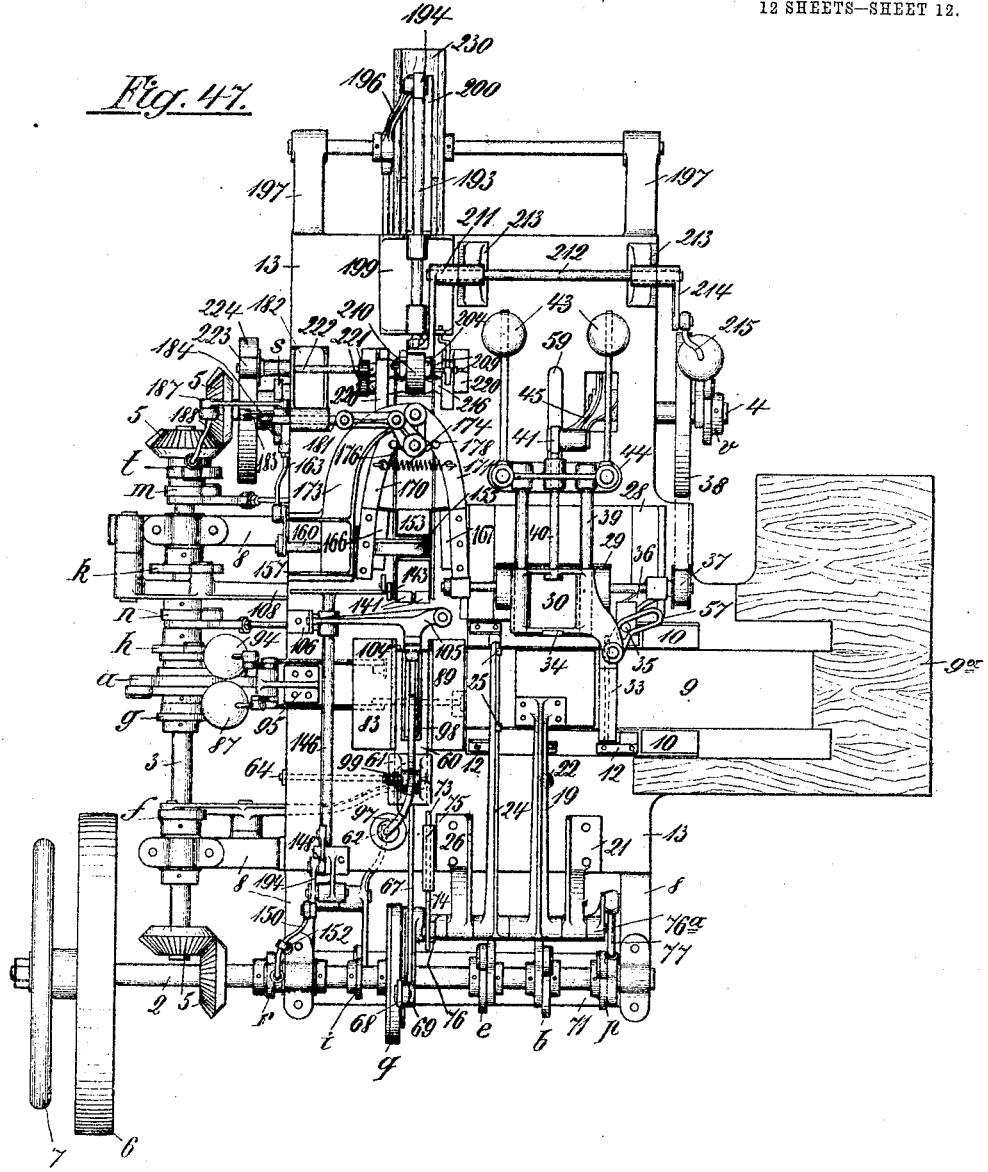

UNITED STATES PATENT OFFICE.

OTTO HESSER, OF CANNSTATT, GERMANY.

MACHINE FOR MAKING PAPER BAGS.

No. 813,207.      Specification of Letters Patent.      Patented Feb. 20, 1906.

Application filed June 24, 1904. Serial No. 214,064.

*To all whom it may concern:*

Be it known that I, OTTO HESSER, a citizen of the German Empire, residing at Cannstatt, in the Kingdom of Würtemberg, Germany, have invented certain new and useful Improvements in Machines for Making Paper Bags, of which the following is a description, reference being had to the accompanying drawings and to the characters of reference marked thereon.

This invention relates to a machine for making paper bags which is characterized by great simplicity and a sure or certain action as compared with other machines for like purposes. While in the machines hitherto employed more than a dozen stages of the operation are necessary in order to collect into the receiving-trough a folded paper bag formed from flat sheets of paper, in this improved apparatus six stages of the operation serve for attaining the same object. The flat paper sheet laid by hand on a table is pushed, by means of a carriage, to the first stage or station and there receives a single layer of paste or gum and is then immediately conveyed by the carriage to the second station or stage, where it is pressed into a folding-box and over a folding-core descending into said folding-box. The folding-core is first held fast in its position in the folding-box, and then by means of two side folders the sheet is folded over the core and the longitudinal seam or fold pressed, by means of an elastic pressure-plate, on the core. Directly afterward the bag-bottom is folded over the end of the core by means of four folders and closed and pressed on the core by an elastic stamp. This stamp releases the bag before the rising of the core, and the bag is raised with the core, the longitudinal seam-folding stamp being lifted simultaneously from off the core in such a way that the raised core now lies perfectly free with the paper bag. A rod is located vertically movable in the folding-core for pushing the paper bag off the core, which rod has a plate at one end lying flush with the end of the core, and this plate when the rod is pushed forward presses internally on the bottom of the paper bag and pushes the latter off the core. The paper bag is now ready for use, as it has a form suitable for filling. If it be desired, however, to press the paper bags flat and collect them close one to another in a distributing or storage trough, the ejected paper bag, which lies between the walls of a passage, is gripped at the open end by two facing elbow or angle pieces and compressed from above downward by means of two facing-plates and creased in the center by means of two angle-plates laterally carried toward one another, at one end of which plates there are provided rectangular folders standing at right angles to the angle-plates, which folders fold inwardly in a triangular form flat on the bottom the part of the sides of the bag which are to be folded together and which adjoin the bottom. The paper bag, which is now folded up with the exception of the bottom, which still stands upright, is now gripped at the upper part of the bottom by means of a clamp-tongue and drawn out and by means of a yoke or bent arm the bottom end of the paper bag is depressed and the lower part of the bottom brought between two rotating rollers. These while pressing the paper bag quite flat convey the same onto an inclined slide-plate, from which it is conveyed by means of a pivoted distributing-flap into the distributing-trough. The paper bag may be made with any suitable section of bottom, and the bottom may be folded in various ways.

I will now describe as an example a machine comprising the features of my invention, as shown in the accompanying drawings, it being understood that the details of construction may be modified to suit requirements within the scope of the invention.

Figures 21, 22:
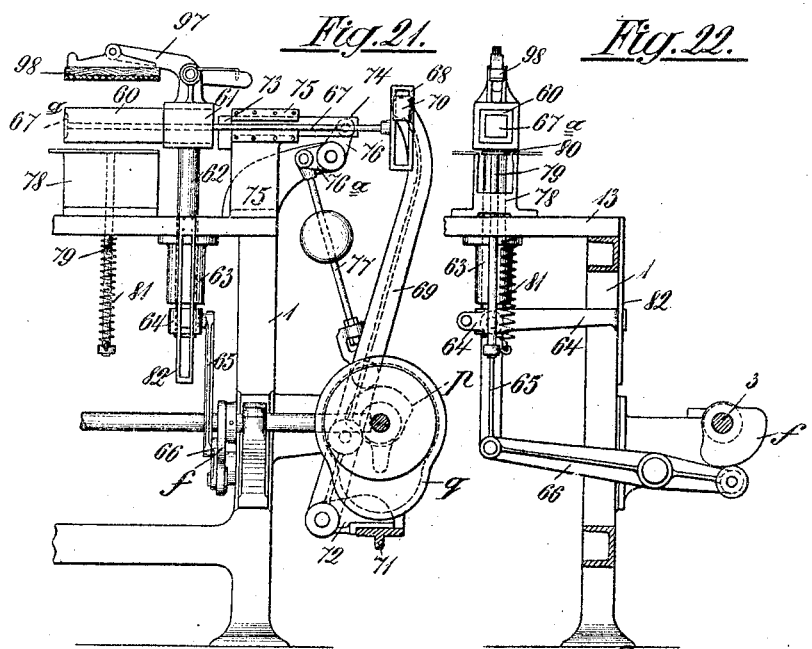

Figure 1 is a view of a sheet of paper from which a bag is to be made, showing the surface to which gum or other adhesive is applied. Fig. 2 illustrates the first fold of the sheet. Fig. 3 shows the second portion of the folding operation. Fig. 4 is a perspective view of a bag after the first bottom-fold has been made. Fig. 5 is an inverted plan view of a bag after the complete folding of the bottom. Fig. 5ª is an elevation of the bag. Fig. 6 is a plan view looking within the bag. Fig. 7 is an elevation of the bag after the sides have been pressed together. Fig. 8 is a plan view of the same. Fig. 9 is a side elevation of the bag, and Figs. 10 and 11 are side and edge elevations of the bag after the bottom has been folded flat. Fig. 12 is a sectional plan view of the machine, showing principally the arrangement of the cams and their carrying-shafts. Fig. 13 is a side elevation of that portion of the machine employed for holding the sheets during the application of the adhesive as viewed from the right of Fig. 47. Fig. 14 is a similar view looking in the same direction, showing the stops for limiting the movement of the paper. Fig. 15 is an elevation looking from the botttom of Fig. 47, showing the paper-feed carriage. Fig. 16 is a plan view of the mechanism shown in Fig. 15. Fig. 17 is an elevation looking from the top of Fig. 47, showing the adhesive-applying device. Fig. 18 is a view of the same mechanism looking from the right of Fig. 47. Fig. 19 is a plan view of the mechanism shown in Figs. 17 and 18. Fig. 20 is an elevation as viewed from the right of Fig. 47, showing the initial folding and pressing means. Fig. 21 is a view of a portion of this mechanism as seen from the opposite side. Fig. 22 is an end elevation of the parts shown in Fig. 21. Fig. 23 is a view similar to Fig. 21, showing also the means for folding over the edges of the sheet on the folding-core. Fig. 24 is an end elevation of the mechanism shown in Fig. 23. Fig. 25 is a view of portions of the folding and the bottom-pressing mechanism looking from the right of Fig. 47. Fig. 26 shows the vertically-movable bottom-folders as seen from the right of Fig. 47. Fig. 27 shows the same mechanism looking from the bottom of Fig. 47. Fig. 28 shows the laterally-movable bottom-folders as shown from the right of Fig. 47. Fig. 29 illustrates the same mechanism looking from the bottom of Fig. 47. Fig. 30 is a side elevation of the flat folding and trough-delivery mechanism looking from the right of Fig. 47. Fig. 31 is a detailed view of a part of this mechanism. Figs. 32 and 33 are detail views of the mechanism for withdrawing the bag from the flat folding mechanism. Fig. 34 is a side elevation of a portion of the flat folding mechanism looking from the right of Fig. 47. Fig. 34$^a$ shows the same mechanism on an enlarged scale and in greater detail. Fig. 35 illustrates the same mechanism as viewed from the right of Fig. 34. Fig. 35$^a$ is a detail view of the means for transmitting movement to the side crimpers. Fig. 35$^b$ is a view, on an enlarged scale, partly in section, on the line $z\,z$ of Fig. 34$^a$. Fig. 36 is a view of the same parts as are illustrated in Fig. 34$^a$, the supporting-arms of the pressing-plates being shown in section. Fig. 37 is a plan view of side crimpers and their operating mechanism. Fig. 37$^a$ is a similar view, on a larger scale and in greater detail. Fig. 38 is a side elevation of one of the side crimpers and its support. Fig. 39 is an end view showing both crimpers. Fig. 40 is a detail view of one of the bag-grippers looking from the left of Fig. 36. Fig. 41 is an elevation looking from the top of Fig. 47, showing principally the pressing-rollers and the receiving-trough. Fig. 42 is a side elevation of this mechanism looking from the left of Fig. 41. Fig. 43 is a sectional elevation of the trough. Fig. 44 is a side elevation of the same, showing the bag-retaining devices. Fig. 45 is a detail view of the flat pressing-rollers. Fig. 46 is a plan view of the receiving end of the trough, and Fig. 47 is a general plan view of the whole machine.

The main shaft 2 is driven by means of a belt-pulley 6, and a hand-wheel 7 is also mounted on said shaft, and this shaft by means of a pair of equal-sized bevel-gears 5 drives a transverse shaft 3, which by similar bevel-wheels gears with a shaft 4, parallel to the main shaft, in such a way that the three shafts all have a similar speed of rotation. The shafts 2 to 4 are held in the machine-frame 1 by means of brackets or bearings 8, and the machine-frame carries a plate 13 above, on which the essential parts of the machine for manipulating the paper bag are located.

The carriage for forwarding the flat paper sheet and the means for operating said carriage are of a well-known type and are shown in vertical elevation and plan view in Figs. 15 and 16, respectively. The carriage 10 has two rails above near a table 9 and flush with the same and is adapted to travel, by means of rollers 11, in grooves of the machine-plate 13. Forwarding projections 12 are provided on the carriage above, and the carriage is operated by means of an arm 14, fixed beneath it, a link 15, and an operating-lever 16, mounted in a bracket 18, by means of a cam-rod 17 from a cam $a$, mounted on the transverse shaft 3. The sheet is laid by hand on the table 9 or a subsidiary table 9$^a$, and the edges of the sheet which project at the sides beyond the table lie on the carriage 10 in front of its rear forwarding projections 12. (Instead of laying the sheet on by hand it may of course be lifted automatically from off the block or pile by means of any suitable known lifting mechanism and laid on the table or the carriage.) By the forward movement of the carriage the sheet is now brought to the gumming-place, where it encounters in front the stop projections 25 of a lowered stop-lever 24, Fig. 14, and is held fast in a correct position by means of a key-plate 20, descending onto the table and the sheet. A lever 19, attached to the key-plate, is elastically pressed against the table by a spring 22 and is pivotally mounted in bearings 21 and operated by means of a cam-rod 23 from a cam $b$, Fig. 13. The stopping-lever 24 is mounted in bearings 26 and operated by means of a cam-rod 27 from another cam $e$. Paste or gum is now applied to two meeting edges of the sheet, which is held fast, Fig. 1, and the mechanism for doing this is shown in Figs. 17, 18, and 19 in two different vertical elevations and a plan view, respectively. As shown in the drawings, one gumming-stamp when applying the gum must lie at right angles to the other. The gumming-stamp 33, which lies transversely to the movement of the carriage, is removably and pivotally mounted on a pin 32 in a projection 31 of a horizontally-displaceable slide 30 in such a way that the moment the slide is pushed forward the stamp 33 lies directly beside the other gumming-stamp 34, which is also removably mounted on the carriage 30. When the carriage 30 moves forward, the two stamps 33 and 34, which now lie in proximity to one another, slide over a constantly-rotating gumming-roller 29, located in the gum or paste container 28 and driven by belt pulleys 37 and 38, and thus take paste or gum from off said roller. When the gumming-stamp moves farther forward, an arm 57, Fig. 19, mounted on the pivot 32 of the front gumming-stamp 33 and having an angular slot in which there engages a pin 35, which is fixed on a fixed standard 36 on the gum or paste container, is turned until the stamp 33 in the foremost position of the carriage 30 stands at right angles to the other stamp 34. The carriage 30 is then lowered, for which object its guide-bars 39 are fixed in a well-known manner to a vertically-displaceable carriage 44, which by means of weights 43 has a tendency to descend and by means of a link-bar 47, an operating-lever 48, pivotally mounted on a bearing 49, and also a cam-rod 50 is operated from a cam $d$, mounted on the parallel shaft 4, Fig. 18. If no lowering of the carriage 44 is to take place, or, in other words, if there is to be no application of gum or paste, a pawl 52, pivotally mounted on a pin 51, is left in engagement with the toothed link-bar 47, the pawl being coupled by a bar 53 with a foot-lever 54, which is raised, by means of a spring 56 and bar 58, so high that the pawl is in engagement. If by pressing on the treadle 55 of this lever 54 the said lever be lowered, the pawl moves out of engagement and the carriage 44 may be lowered—that is to say, gum or paste may be applied. The movement of the horizontal slide or carriage 30 takes place by means of a bar 40 fixed thereon, which bar is displaceably located in the vertical carriage 44 and has an end loop 41, which is supported beneath by means of an angularly-bent bar 59, fixed on the vertical carriage 44. The head of a pin mounted on a bell-crank lever 45 engages in the loop, which lever is moved by a cam-rod 46 from a cam $c$, mounted on the parallel shaft 4. The gummed or pasted sheet after being released by the holding-stamp 20 is now pushed by the paper-carriage 10 over the folding-box 78, and at this second stage of the operation the paper bag is finished by being folded over the core. The mechanism for doing this is shown in Figs. 20 to 29 and is as follows: The folding-box 78 is fixed on the machine-plate 13 and suitably recessed internally with the object of receiving a folding-core 60 in such a way that when the folding-core is lowered it lies with its upper part and sides approximately flush with the folding-box, and its upper surface forms a smooth support for the folding-slide. In the recess of the folding-box 78 there lies a thin sheet-metal plate 80, which when the core is raised also lies flush with the top of the folding-box and is fixed on a vertically-displaceable bar 79, which is pressed upward by a spring 81, surrounding the bar. In the folding of the bag this plate is pressed downward by the folding-core against the spring-pressure against the core, or rather against the part of the paper sheet lying beneath same, and rises again with the core, facilitating the removal of the paper bag from the folding-box. The folding-core 60 is removably mounted in a frame 61, which is carried by a vertically-displaceable bar 62. This bar is guided in a socket 63, fixed beneath on the upper plate 13, and on the bar an arm 64 is mounted, one end of which is guided in the slot of a bar 82, fixed on the machine-frame 1, Fig. 21, in order to prevent the turning of the folding-core. The rising and lowering of the folding-core 60 is operated by a link 65, connecting the bar 62 with an operating-lever 66, the latter being operated from a cam $f$ on the transverse shaft 3, Fig. 22. When the folding-core is lowered, the sheet lying flat over the folding-box 78 is pressed into its recess, the sheet A, as shown in Fig. 2, forming flaps projecting to an unequal height. As soon as the folding-core has reached its lowest position it is retained by a projection 73, which moves over it, a rod 74 of said projection being mounted so as to be capable of horizontal displacement in a bearing 75 by means of suitable levers 76 and 76$^a$, mounted on a pin common to both, operated by means of a cam-rod 77 from a cam $p$ on the main shaft 2. After the folding-core has descended the shorter of the projecting flaps of the sheet A, Fig. 2, is first pressed by a folding-plate 83, Figs. 23, 24, and 27, over the folding-core, and then the other gummed flap is pressed down by a further folding-plate 89 over the one which was already folded down, whereupon the elastic pressing on stamp 98 for the longitudinal fold or seam is lowered and pressed down on the paper tube thus formed. The longitudinal fold-forming plate 83 is mounted on a bearing 84, which is horizontally displaceably carried by means of a bar 85 and operated by an elbow-lever 86 from a cam-rod 87 by means of a cam $g$ on the transverse shaft 3. The further plate 89 for folding the longitudinal fold is mounted on a bearing 90, which is horizontally displaceably carried by means of a bar 91 and connected by a coupling-rod 92 with an elbow-lever 93 and operated by a cam-rod 94 from a cam $h$, Figs. 23 and 24. The pressing on stamp 98 is pivoted to a lever 97, which is pivotally mounted on an arm 96, arranged on the core-carrying frame 61 and held by a spring 99 in a certain position. On the descent of the folding-core 60 the pressing-on stamp 98 descends with it, but of course is only pressed on the core when the longitudinal folding-plates 83 and 89 have completed their work. The turning movement of the lever 97, connected with the pressing-on stamp, is operated by means of a bar 100, displaceable in a socket 101, which bar is connected, by means of a coupling-rod 102, with a lever 103. The rod 100 is lifted by a cam $i$, moving the last-mentioned lever, and strikes the loose end of the pressing-on stamp-lever 97, and thereby the pressing-on stamp 98 is pressed on the core. The folding and closing of the bottom then takes place immediately, for which purpose the mechanism shown in Figs. 26, 27, 28, and 29 is employed. This consists of four folding-slides 104, 111, 119, and 120, which successively come in operation. First the upper folding-slide 104 folds the part of the uppermost side of the partly-formed bag projecting beyond the folding-core 60 on the end of said folding-core, whereupon the lower gummed side of the bag is folded immediately by the slide 111 over the part which has just been folded down and is stuck thereon. The third and fourth folding-slides 119 and 120 then come into action, first the slide 119 and afterward the slide 120, and fold the bottom completely together. After these folding-slides have moved apart again the pressing-on stamp 131, which is provided with an elastic plate, immediately presses the folded bottom firmly against the core. The upper folding-slide 104 is triangular in shape and is mounted on an arm 105, one end of which is fixed on a bar 107, and the other slides on a guide-bar 106, fixed on the machine-plate 13. The folding slide-bar 107 is vertically displaceable in a bearing 110, screwed on the upper plate 13 and connected by a coupling-link 116 with an operating-lever 108, one end of which is pivotally mounted. This spring 109 holds a roller on the lever in engagement with a cam $k$, from which it receives movement. The lower or second folding-slide 111 is mounted on a bar 112 vertically displaceable in bearing 110, which bar is connected with an operating-lever 114 by a coupling-rod 113, said lever being pressed, by means of a spring 115, against a cam $l$ and receiving movement from the latter, Fig. 27. The third and fourth folding-slides 119 and 120 are mounted on levers 121 and 122, which are pivotally held in a bearing 123 common to both fixed beneath on the machine-plate 13 and are returned to their position of repose, respectively, by springs 124 and 125. The third folding-slide 119 is operated by means of an arm 127, mounted on the same shaft 126 with the lever 121, said operation being by the intermediary of a cam-rod 128 from a cam $m$, the other or fourth folding-slide 120 by means of a cam-rod 129 directly connected with the same from a cam $n$. Both cams are mounted on the transverse shaft 3, Fig. 29.

The pressing-on stamp 131, Fig. 25, or rather its carrying-bar 132, is displaceably arranged in a bearing-support 135, mounted on the machine-plate 13 and is held in a given position by a set-ring 138, mounted on the bar 132, or rather on the ring 138, which fixes the same. The movement of the bar 132 is effected by means of a lever 133, acting on the end of the bar 132, which lever is pivotally mounted on a pin 140, mounted in a suitable bearing 135, an operating-lever 139 being also mounted on said pin. This operating-lever is operated by a cam-rod 134 from a cam $o$, mounted on the shaft 4, and the movement is transmitted to the bar 132 and stamp 131, and this in its forward movement is pressed elastically or yieldingly against the bottom of the bag. Before the folding-core is raised the stamp 131 for pressing on the bottom moves back. On the rising of the core 60 the longitudinal folding-stamp 98 also moves away from the core and the paper bag lies free thereon. The paper bag is then ejected, the following mechanism serving for that purpose, Figs. 20 to 22: An ejecting or pushing-off bar 67 is displaceably mounted in the folding-core 60, which bar has at one end a small plate $67^a$, lying flush with the core end, and at the other end a loop 68, in which the head 70 of a pin mounted on the upper end of the operating-lever 69 engages. The ejecting-bar 67 descends and rises with the folding-core. In order to eject the paper bag, a cam $q$, mounted on the main shaft 2, moves the operating-lever 69, pivotally mounted on its bearing 72, and the bar 67 is moved, causing the plate $67^a$ in the end of the rod to engage the bottom of the bag and force it off the core. The paper bag is then immediately available for use and has a form suitable for filling. For storage or transport purposes the bag must, however, be folded flat, as otherwise it would take up too much room, and this is done by means of the mechanism shown in detail in Figs. 30 to 40. The paper bag after being removed from the core lies between the side walls 189 of a passage or channel and is first engaged at the open end by the pivoted elbow-pieces 141. These elbow-pieces are mounted on two facing-plates 153 and 154 and enter the bag, while the plates 153 and 154 move toward each other for the purpose of pressing together the prismatic paper bag, Figs. 34 to 36. The elbow-pieces 141 are mounted on pins 142, which carry small cranks 143, which at the other end have pins 145, by means of which they engage in a loop or lug 144, which lies on the end of a suitable bar 146. The latter is connected, by means of a coupling-rod 148, with an elbow-lever 149, pivoted to bracket 151, which elbow-lever is moved by a cam-rod 150 from a cam $r$, while a spring 152 draws the rod 150 against the said cam $r$. If the bar 146 and loop or ring 144 be moved in the direction indicated by the arrow in Fig. 36, the elbow-pieces 141 will enter the paper bag lying between the plates 153 and 154 and press said bag against said plates. The plates 153 154 are then moved together. These plates are mounted on arms 155 and 156, Fig. $35^b$, which are vertically movable in guides 158 on a bearing-support 157, fixed on the plate 13 and drawn together by means of springs 159, secured to both arms. Projecting revoluble rollers 164 and 165 are arranged on the arms 155 and 156, which rollers bear on a cam 161 and are drawn against the latter by springs 159. The cam-disk 161 is mounted on a shaft 160, which is revoluble in bearing-supports 157 and has at its other end a lever 162, which is rocked forward or backward to the extent of a quarter-revolution by means of a cam-rod 163 from cam $s$, the cam 161 also sharing in this movement. By this means the plates 153 and 154 are approached to one another or separated.

The sides of the bag are creased in simultaneously with the pressing flat of the bag by means of the following arrangement, Figs. 37 and $37^a$: Two angle-plates 166 and 167 are mounted facing one another on two arms 170 and 171, pivoted on a pin 172, common to both, an edge of each plate being pressed against the middle of the two sides of the paper bag taken lengthwise at the moment when the compression of the bag takes place. By this means a creasing in of the bag is effected. The movement of the creasing angle-pieces 166 and 167 is effected by means of a cam 176, revoluble on a pin 177, on which cam bear rollers 178, revolubly mounted on the arms 170 and 171 and are held in engagement with said cam by a spring 174, connecting these two arms. The pin 177 of the cam is mounted on a laterally-projecting arm 173, fixed on bearing-supports 157, and a lever 179 is firmly mounted on this pin and connected by a link-piece 180 with a rod 181, displaceably arranged in bearing-supports 182. This rod is connected with a lever 184, Figs. 34, 37, and $37^a$, by a further link 183, which lever is mounted on a pin 185, Fig. $35^a$, which is located in a projection 186 of the bearing-support 182, and carries on the other side another lever 187, which is operated by a cam-rod 188 from a cam $t$, mounted on the shaft 3. At each revolution of this cam $t$ the cam 176 is turned forward and backward ninety degrees, causing the creasing-plates to crease together the paper bag and again release it. By this means a paper bag of flat form, but with the bottom turned up vertically, is thus produced from a paper bag of prismatic form. In order that the parts of the bag adjoining the bottom of the two faces of the bag which have been creased together may rest better on the bottom, two triangular plates 168 and 169 are fixed each at suitable ends of the angle or elbow plates 166 and 167 and directly connected with their supporting-arms 170 171 by recessed plates 175, Figs. $35^b$, 38, and 39. These triangular plates press the sides directly triangularly onto the bottom, and thereby effect a clean flat creasing together, especially against the bottom. The paper bag, which is now pressed flat, but has a bottom projecting vertically, is now engaged by the bottom by means of a separate device for drawing it forward and is conveyed between two forwarding-rollers and pressed perfectly flat by the latter and placed on an inclined slide-plate in front of a distributing-flap and by the latter conveyed into a storing-trough and there arranged. The devices for this operation are shown in Figs. 30 to 33 and 41 to 46.

A channel 190, forming a continuation of the channel formed between the plates 189, is held fast against the latter by means of elbow-pieces 191. In this channel 190 a pressing-on stamp 192 is displaceably arranged, which on the completion of the creasing in and compression of the paper bag is pushed forward until it bears against the bottom of the paper bag, Fig. 31. This movement is effected as follows: The pressing-on stamp 192 is mounted on a bar 193, displaceably mounted in bearing-supports 199, which bar has at its rear a loop 194. This loop is carried beneath by a bearing 200, mounted on stands or supports 199. The head or plate 195 of a pin attached to an operating-lever 196 engages in the ring or loop, and the lever 196, pivotally mounted in a bearing 197, is moved, by means of a cam-rod 198, from a cam $u$—that is to say, is turned—until the pressing-stamp bears against the bottom of the paper bag. An arm 201 is fixed on the stamp 192, and in this arm a pin 202 is revolubly and transversely mounted. This pin has in its middle a grip-tongue 204 and at the side a contact-arm 203. When the pressure-stamp 192 is pushed forward, the contact-arm encounters in front an elbow-piece 207, mounted on a fixed bearing 208, and is turned about ninety degrees. The grip-tongue 204 engages over the upper vertically-standing part of the bottom of the bag and presses this part of the bottom flat against the pressing-stamp 192, the action being assisted by a spring 205, one end of which is fixed on a laterally-projecting pin 206, fixed on the arm 201, while the other end of the spring acts on the grip-tongue 204. The position of the spring is such that when the grip-tongue is closed it is pressed by the spring firmly against the pressing-stamp 192, and when the grip-tongue is opened the spring 205 has passed the dead-point, and the grip-tongue is retained in an open condition, Fig. 32. When the grip-tongue has engaged the bottom of the paper bag, the pressing-stamp and grip-tongue and bag move backward, and toward the end of this backward movement, the contact-arm 203 strikes at the rear against an adjustable contact-pin 209 and the grip-tongue is opened, thus releasing the bag. Beneath the channel 190, in proximity to the bottom of the bag which has just been conveyed, there lies a pair of rollers 216 217, one (217) of which is elastically pressed against the other by means of springs 218, the bearings of said roller being displaceably mounted in the arms 219 of a bearing-support 220. Both rollers elastically pressed against one another are revolved by mutually engaging toothed wheels 221, and the shaft 222 of one roller is driven by belts from belt-pulleys 223 and 224, Figs. 41 and 42. Now as soon as the bag is released by the grip-tongue it is engaged directly behind the bottom by a pivoted sheet-metal segment 210 and pressed so far down that the lower part of the bottom of the bag comes between the two rollers and is engaged by them and drawn through them and pressed flat and delivered onto an inclined slide-plate. The sheet-metal segment 210 is fixed on an arm 211, mounted on a shaft 212, which is held in bearings 213 on the machine-plate 13. A lever 214 is mounted on the same shaft 212 and operated by means of a cam-rod 215 from a cam $y$, mounted on the shaft 4. The paper bag, which has now been pressed perfectly flat by the rollers and conveyed onto the inclined delivery or slide plate 225, lies in front of a distributing-flap 226, which is mounted at the end of the storage-trough 230 on a shaft 227, mounted on a bearing 228 on the trough. As soon as the now flat-pressed paper bag lies in front of the flap 226 the latter is turned from its inclined position into a vertical one, and thereby the bag is forwarded into the collecting-trough and there retained. The flap 226 is moved by means of a lever 231, mounted on the shaft 227 of the flap, and a cam-rod 232 from a cam $w$, mounted on the shaft 4. The shaft 227 is held by one end in bearing 228 and at the other end in a bearing 229, Figs. 41 and 42.

In order to lift the paper bags deposited in the trough 230, retaining catches or projections 234 are employed. These catches are carried on pins 233 during the introduction of a paper bag by the distributing-flap, are turned aside, and then again spring into the trough on the return movement of the flap, for which object the flap is recessed at a suitable place. The passing in and out of the retaining-catches 233 through the recesses 235 of the sides of the trough 230 is effected by means of arms 236, fixed on the pins, which arms are connected, by means of rods 237, with the ends of levers 238 and 240, which are fixed on a shaft 239 common to both held in bearings 228 and of which one lever 240 is formed as an elbow-lever and operated by a cam-rod 241 from a cam $x$, mounted on the shaft 4. The levers are retained in given positions by means of a spring 242, acting on the lever 240, in which positions the retaining projections or catches 234 are held in the trough behind the paper bags. Before the introduction of a fresh bag the retaining-catches are moved aside by means of the cam $x$ and directly afterward turned behind the bags again by the spring 242.

In order that the bags lying closely one behind the other in the distributing-trough may find a certain slight resistance, a counter support 243 is slidably arranged in such a way that it opposes a slight resistance to its displacement. The compressed paper bags pressed closely against one another are removed from the distributing-trough in suitable numbers and packed for stock or may be directly conveyed to the places where they are to be utilized.

At each revolution of the three principal shafts 2 to 4 a fresh paper sheet or paper bag, as the case may be, is each time moved forward from one stage to the next and a finished paper bag delivered into the collecting-trough. If the paper bags are not folded up, only three operating stages are necessary; but if the paper bags are to be folded up and pressed flat and stored six operating stages are necessary, while hitherto at least a dozen such stages were necessary in older machines. The machine is thus very considerably simplified, and in addition all kinds of paper bags with any suitable form of bottom may be made therein.

The paper bags hereinbefore referred to and shown in Figs. 1 to 11 are of course only a few examples, which are intended to indicate how the paper bags may be made and with what bottom form and bottom folding. It is evident that a large number of other forms and other arrangements for the folding and closing of the bottom may also be adapted and made on the machine without altering the character of the machine.

Having thus described the invention, what is claimed is—

1. In a paper-bag machine, a folding-box, a core movable thereinto, means for feeding a sheet of paper over the box, means for supplying an adhesive to the paper in advance of its arrival over the box, means for depressing the core and thus folding an intermediate portion of the sheet within the box, means for folding over the upstanding edges of the paper, means for pressing the longitudinal seam so formed, means for folding one end of the paper over the core to form a bottom, means for forcing the bag from the core, means for engaging and holding opposite sides of the bag, means for creasing the remaining sides inward, mechanism for moving the engaging and clamping means toward each other during such creasing operation to flatten all but the bottom of the bag and means for gripping a portion of the bottom and withdrawing the same from the creasing and pressing mechanism.

2. In a machine of the class described, an adhesive-applying device including a paste-roller, a pair of stamps normally arranged in parallel relation with each other and the roller, means for moving the stamps over the roller, means for moving one of the stamps to dispose them in angular relation, and means for depressing said stamps; substantially as described.

3. In a machine of the class described, an adhesive-applying device including a paste-roller, a horizontally and vertically movable carriage, a pair of stamps arranged on the carriage in parallel relation and movable over the roller, and means for moving one of the stamps into angular relation to the other during such movement; substantially as described.

4. In a machine of the class described, an adhesive-applying device including a paste-roller, a horizontally and vertically movable carrier, a pair of stamps, one secured to the carriage and the other pivoted thereto, both of said stamps being normally disposed in parallel relation and movable over the paste-roller, an arm carried by the pivoted stamp and having a cam-slot, and a stationary pin engaging in said cam-slot to effect pivotal movement of the stamp; substantially as described.

5. In a machine of the class described, a movable paper-carriage, a paste-roller, a stamp pivoted at one side of the path of movement of the carriage, and means for swinging the stamp on its pivot between the roller and to an applying position at an angle to the path of movement of the carriage; substantially as described.

6. In a machine of the class described, the combination with a pair of pressing-plates between which the formed bag is fed, of means for engaging and clamping two opposite edges of the open end of the bag against said plates, creasing member for engaging the free sides of the bag, and means for forcing one plate toward the other to flatten the bag; substantially as described.

7. In a machine of the class described, a bag creasing and flattening means, including flattening-plates, grippers for holding two of the sides of the bag to the plate, means for creasing the two remaining sides of the bag, and means for moving said plates toward each other; substantially as described.

8. In a machine of the class described, the combination with bag creasing and flattening devices, of a feeder, a gripping-jaw carried thereby, means for actuating the jaw to engage a portion of the bottom of a bag, means for moving the feeder and gripping-jaw, and means for removing the bag from the jaw and feeder; substantially as described.

9. In a machine of the class described, the combination with an automatic bottom-gripper, of a segmental feeding-plate for removing the bag from the gripper, and a pair of flattening-rollers to which the bag is fed by said plate; substantially as described.

In testimony whereof I affix my signature in presence of two witnesses.

OTTO HESSER.

Witnesses:
 AUGUST DRAUTZ,
 WALTER SCHWAEBSCH.